US008602063B2

(12) United States Patent
Snider et al.

(10) Patent No.: US 8,602,063 B2
(45) Date of Patent: Dec. 10, 2013

(54) GAS OVER LIQUID ACCUMULATOR

(75) Inventors: Terrance R. Snider, Belchertown, MA (US); Kurt J. Doughty, Berlin, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 344 days.

(21) Appl. No.: 13/022,924

(22) Filed: Feb. 8, 2011

(65) Prior Publication Data

US 2012/0199229 A1 Aug. 9, 2012

(51) Int. Cl.
*F16L 55/04* (2006.01)

(52) U.S. Cl.
USPC .................. 138/26; 138/30; 138/31; 138/37; 138/41

(58) Field of Classification Search
USPC ........ 138/26, 27, 28, 30, 31, 37–46; 417/416; 251/297, 129.08; 137/625.61; 123/447; 903/960; 180/165
See application file for complete search history.

(56) References Cited

U.S. PATENT DOCUMENTS 3,015,345 A 1/1962 Michael
3,097,504 A 7/1963 Quick et al.
3,677,334 A 7/1972 Bathla et al.
4,067,381 A 1/1978 Lord
4,231,230 A 11/1980 Gratzer et al.
4,246,978 A * 1/1981 Schulz et al. ................ 180/165
4,350,220 A * 9/1982 Carman ........................ 180/165
4,376,619 A 3/1983 Haushalter et al.
4,538,972 A 9/1985 Gooden
4,562,036 A * 12/1985 Shin et al. ..................... 376/283
4,606,376 A * 8/1986 Bernard et al. ................. 138/30
4,691,739 A 9/1987 Gooden
4,735,750 A * 4/1988 Damann ......................... 261/29
4,823,827 A 4/1989 Olejak
4,838,299 A * 6/1989 Behrens ........................ 137/203
5,214,931 A 6/1993 Paige
5,255,527 A 10/1993 Paige
5,520,208 A * 5/1996 Schneider ..................... 137/207
5,603,244 A * 2/1997 Tischer ........................ 74/500.5
5,624,105 A * 4/1997 Runkel ...................... 267/64.15
5,694,968 A * 12/1997 Devall et al. .................. 137/202
5,732,740 A * 3/1998 Hornyack et al. ............... 138/26
6,095,486 A * 8/2000 Ivers et al. ............... 251/129.01
6,123,323 A * 9/2000 Yoneda et al. .................. 261/96
6,298,877 B1 * 10/2001 Inuki et al. ............... 137/625.11
6,328,875 B1 * 12/2001 Zappi et al. ................... 205/500

(Continued)

FOREIGN PATENT DOCUMENTS

FR 817199 A 8/1937

OTHER PUBLICATIONS

Extended European Search Report from EP Application No. 12153400.2; dated Feb. 7, 2013, 4 pages.

*Primary Examiner* — Kevin P Shaver
*Assistant Examiner* — Christopher Luzecky
(74) *Attorney, Agent, or Firm* — Kinney & Lange, P.A.

(57) ABSTRACT

A fluid system comprises a pressure vessel with a baffle oriented at a skew angle. The baffle divides the vessel into first and second volumes. A first port is provided to introduce a pressurizing fluid into the first volume, and a second port is provided to circulate a working fluid within the second volume. A purge aperture is provided to purge the pressurizing fluid from the second volume across the baffle into the first volume, and a flow aperture is provided to transfer the working fluid through the baffle between the first and second volumes.

25 Claims, 3 Drawing Sheets

(56) References Cited

U.S. PATENT DOCUMENTS

| | | | | |
|---|---|---|---|---|
| 6,418,970 | B1 * | 7/2002 | Deul | 138/31 |
| 6,494,057 | B1 | 12/2002 | Schuster et al. | |
| 6,615,606 | B2 | 9/2003 | Zywiak | |
| 6,619,325 | B2 * | 9/2003 | Gray, Jr. | 138/30 |
| 6,644,354 | B2 * | 11/2003 | Dinkel et al. | 138/30 |
| 6,866,066 | B2 * | 3/2005 | Weber | 138/31 |
| 6,971,411 | B1 * | 12/2005 | Draper | 138/30 |
| 7,234,490 | B2 * | 6/2007 | Dorr | 138/31 |
| 7,578,870 | B2 * | 8/2009 | Dean | 95/241 |
| 7,661,442 | B2 * | 2/2010 | O'Brien et al. | 138/31 |
| 7,918,246 | B2 * | 4/2011 | Stroganov | 138/30 |
| 7,971,608 | B2 * | 7/2011 | Crimpita | 138/31 |
| 8,046,107 | B2 * | 10/2011 | Zugibe et al. | 700/275 |
| 8,048,211 | B2 * | 11/2011 | Behruzi et al. | 96/190 |
| 8,291,938 | B2 * | 10/2012 | Kennedy et al. | 138/31 |
| 2003/0075225 | A1 * | 4/2003 | Dinkel et al. | 138/31 |
| 2005/0061379 | A1 * | 3/2005 | Mori et al. | 138/31 |
| 2005/0081559 | A1 * | 4/2005 | McGregor et al. | 62/503 |
| 2009/0165451 | A1 * | 7/2009 | Mueller et al. | 60/478 |
| 2010/0050622 | A1 * | 3/2010 | Stroganov | 60/413 |
| 2010/0206389 | A1 * | 8/2010 | Kennedy et al. | 137/14 |
| 2010/0294036 | A1 * | 11/2010 | Dunbar | 73/304 C |

* cited by examiner

GAS OVER LIQUID ACCUMULATOR

BACKGROUND

This invention relates generally to fluid systems, and specifically to accumulator and reservoir systems for working fluids. In particular, the invention concerns an accumulator or reservoir configured to accommodate thermal expansion and other demands in a closed-loop fluid circulation or hydraulic system.

Accumulators, reservoirs and accumulator-reservoir devices provide pressure and fluid storage capacity for a range of different working fluid applications, including cooling systems, hydraulics and engine lubrication. In general, accumulator capacity is selected to accommodate thermal expansion of the working fluid, and to moderate system loads during pulsed or intermittent cycling and high peak demand. Accumulators and reservoirs also provide reserve fluid capacity in the event of leakage, and to account for fluid consumption and operational losses.

SUMMARY

This invention concerns a fluid accumulator system. The system comprises a pressure vessel with a baffle oriented at a skew angle, dividing the vessel into two volumes. Pressurizing fluid is introduced into the first volume at a first port, and working fluid is circulated within the second volume at a second port.

A purge aperture is provided to purge pressurizing fluid from the second volume across the baffle to the first volume. A flow aperture is provided to transfer working fluid through the baffle between the first and second volumes.

DETAILED DESCRIPTION

Figure 1:
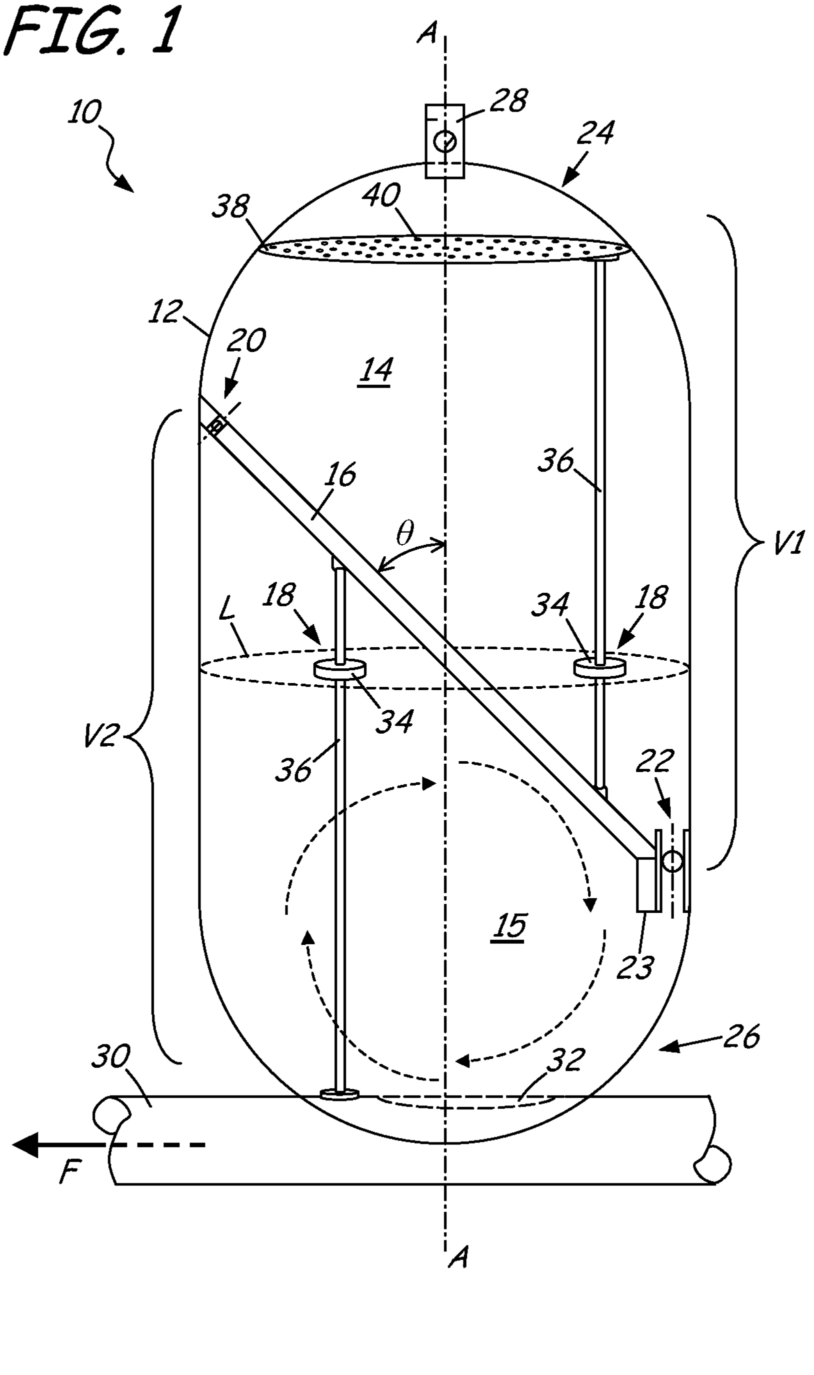
FIG. 1 is a schematic side view of a fluid accumulator with a baffle dividing the pressure vessel into two separate volumes.

FIG. 1 is a schematic side view of accumulator system 10 with pressure vessel 12 containing pressurizing fluid 14 and working fluid 15. Baffle 16 divides pressure vessel 12 into separate volumes V1 (upper) and V2 (lower), with individual level sensors 18. Reservoir volumes V1 and V2 communicate via purge aperture 20 and flow aperture 22, providing accumulator 10 with improved leak detection and fluid level measurement capability as described below.

Pressure vessel (or chamber) 12 comprises a pressure wall or housing formed of strong, stress-resistant and impact-resistant material such as stainless steel, aluminum or another metal or metal alloy. In the particular embodiment of FIG. 1, pressure vessel 12 has a generally oblong or cylindrical geometry, with convex top and bottom portions 24 and 26. In some embodiments, one or both of top portion 24 and bottom portion 26 is convex. Alternatively, pressure vessel 12 has another shape, such as a sphere, or pressure vessel 12 comprises one or more substantially planar wall sections.

Pressurizing fluid (or charging fluid) 14 typically comprises an inert gas such as nitrogen or argon. Pressurizing fluid 14 is introduced into volume V1 via port 28 in top portion 24, in order to pressurize (or charge) pressure vessel 12. In some embodiments, top (gas) port 28 includes a bleed or pressure relief valve for bleeding excess pressurizing fluid 14, to regulate the charge or operating pressure inside accumulator 10.

Working fluid 15 comprises a cooling fluid, lubricating oil, hydraulic fluid or other process liquid or fluid. Working fluid 15 circulates through reservoir volume V2 by exchange with flow F in line 30, at fluid port 32 in bottom portion 26 of pressure vessel 12. In one particular embodiment, working fluid 15 comprises a propylene glycol-based coolant such as DOWFROST™ heat transfer fluid, as available from the Dow Chemical Company of Midland, Mich., and flow F is used to cool power electronics for aviation applications.

Baffle 16 comprises a solid plate or sheet metal partition, which extends across the inside of pressure vessel 12 to divide accumulator 10 into two separate volumes V1 and V2. Baffle (or baffle plate) 16 is welded or bonded along the inner surface of pressure vessel 12 to form a fluid seal. The seal prevents flow of pressurizing fluid 14 and working fluid 15 between reservoir volumes V1 and V2, except at purge aperture 20 and flow aperture 22, described below.

As shown in FIG. 1, baffle 16 is oriented along a diagonal with respect to pressure vessel 12, making skew angle $\theta$ with accumulator axis A. In this skew or diagonal orientation, baffle 16 is neither parallel nor perpendicular to axis A, and volumes V1 and V2 overlap along the axial direction.

Skew angle $\theta$ is defined by the acute angle between the plane of baffle 16 and accumulator axis A. In the embodiment of FIG. 1, baffle 16 is substantially planar and skew angle $\theta$ is between about 30° and about 60°, for example about 45°. Alternatively, skew angle $\theta$ is between about 15° and about 75°. For cylindrical geometries, skew angle $\theta$ can also be measured with respect to the inner wall of pressure vessel 12, and for non-planar baffles 16 skew angle $\theta$ is defined by a tangent plane at the intersection with axis A.

Level sensors or gauges 18 comprise floats 34 which slide along rods or stems 36 to determine level L of working fluid 15 in volumes V1 and V2. Stems 36 are variously anchored or attached to baffle 16, flow line or pipe 30, an inside surface of pressure vessel 12, or another internal structure such as perforated plate (or perforate element) 38, described below.

In some embodiments, stems 36 comprise reed switches or Hall-type sensors, which are activated by magnetic floats 34. Alternatively, level sensors 18 comprise reel, spool, or cable-type float devices, linear-variable-displacement transducers (LVDTs), or pressure or capacitance-based sensor elements. In further embodiments, level sensors 18 utilize optical, ultrasonic or radio-frequency (RF) sensing technology.

Purge aperture 20 comprises one or more small holes formed in baffle 16 between volumes V1 and V2, typically in an upper portion proximate the inner surface or wall of pressure vessel 12. The purge holes are sized to allow gaseous pressurizing fluids 14 to cross baffle 16 between reservoir volumes V1 and V2, while substantially limiting the flow of liquid working fluids 15. Purge aperture 20 thus purges pressurizing fluid and entrapped gas that has been de-aerated from working fluid 15 in lower volume V2, preventing pressuring fluid (gas) 14 from entering process flow F. At the same time, purge aperture 20 is sized to limit or substantially prevent the flow of liquid working fluids 15; so that liquid flow across baffle 16 is substantially limited to flow channel 22.

The size and configuration of purge aperture 20 depend upon the viscosity of fluids 14 and 15, and related operating conditions such as temperature and pressure. In one particular embodiment, purge aperture 20 comprises a single hole of about 0.040±0.005 inches (1.016±0.127 mm) or less in diameter. Alternatively, purge aperture 20 comprises one, two, three or more spaced holes in baffle 16, with individual diameters of about 0.100 inches (2.540 mm) or less, about 0.080 inches (2.032 mm) or less, about 0.060 inches (1.524 mm) or less, about 0.050 inches (1.270 mm) or less, about 0.040 inches (1.016 mm) or less, about 0.020 inches (0.508 mm) or less, or about 0.010 inches (0.254 mm) or less.

In contrast to purge aperture 20, flow aperture 22 is sized to allow liquids and other working fluids 15 to flow across baffle 16, in order to transfer working fluid 15 between reservoir volumes V1 and V2. In one particular embodiment, flow aperture 22 has a diameter of about 0.50±0.05 inches (about 12.7±1.3 mm) or more. Alternatively, flow aperture 22 has a diameter of about 0.25 inches (6.4 mm) or more, about 0.75 inches (19.1 mm) or more, or about 1.00 inches (25.4 mm) or more.

Flow sensor 23 is positioned inside or near (proximate) flow aperture 22, in order to measuring the flow rate of working fluid 15 across baffle 16, between reservoir volumes V1 and V2. In differential pressure-based (DP) embodiments, flow aperture 22 comprises a restriction orifice, Venturi tube or other restrictive flow element, and sensor 23 comprises a DP element positioned along or across the restriction to measure the flow rate based on a differential pressure or pressure drop. In alternate embodiments, flow aperture 22 comprises another flow structure such as a Dall tube, Pitot tube, flow pipe, flow tube or flow orifice, and sensor 23 comprises another flow measurement device such as a mechanical rotor, ultrasonic flow sensor or electromagnetic flow sensor.

In the substantially vertical orientation of FIG. 1, accumulator 10 operates as a partial flow through gas-over-liquid accumulator or accumulator-reservoir. Pressurizing fluid 14 (e.g., nitrogen gas) is introduced into upper volume V1 via top port 28, above working fluid 15. Working fluid 15 (e.g., a cooling fluid, hydraulic liquid or lubricating oil) circulates through lower volume V2 via bottom (liquid) port 32 in flow line 30, below pressurizing fluid 14.

Flow F is driven by an external pump, introducing a stir or vortex circulation (arrows) in lower volume V2 of pressure vessel 12. Circulating flow F mixes with working fluid 15 in pressure vessel 12, exchanging a portion of the reservoir and flow volumes through bottom port 32 during each fluid loop. Alternatively, flow F is pulsed, for example in hydraulic applications, and working fluid 15 may flow directly into or out of line 30 at bottom port 32.

System pressure is determined by regulating pressurizing fluid 14 at top port 28. In aviation applications, accumulator 10 is typically charged (pressurized) during ground maintenance operations, but system pressure can also be regulated in real time using an on-board inert gas system, or another source of pressurizing fluid 14.

In cooling applications and other flow systems using liquid working fluids 15, an overpressure is typically maintained to prevent cavitation, or to address hydraulic, lubrication, and other system requirements. In some embodiments, the minimum head pressure is about 20-22 psi (140-150 kPa). Alternatively, the pressure is lower or higher, for example 5-10 psi (35-70 kPa) or less, or 145-150 psi (1,000-1,030 kPa) or more.

In steady state operation, gas bubbles disperse or percolate out of working fluid 15, and the pressure in reservoir volumes V1 and V2 is equalized by flow of pressurizing fluid 14 through purge aperture 20 in baffle 16. Level sensors 18 provide volume measurements based on the level of working fluid 15 in volumes V1 and V2, on either side of baffle 16, and the liquid levels are equalized by flow through flow aperture 22.

Signals from level sensors 18 are temperature compensated to account for thermal expansion and time averaged or smoothed for maintenance display, for example using a hysteresis filter with first order lag. Level sensors 18 also provide slow leak detection for time scales on the order of hours, days, weeks or more. Fast leak detection is provided by flow aperture 22 and flow sensor 23, described below.

Figure 2:
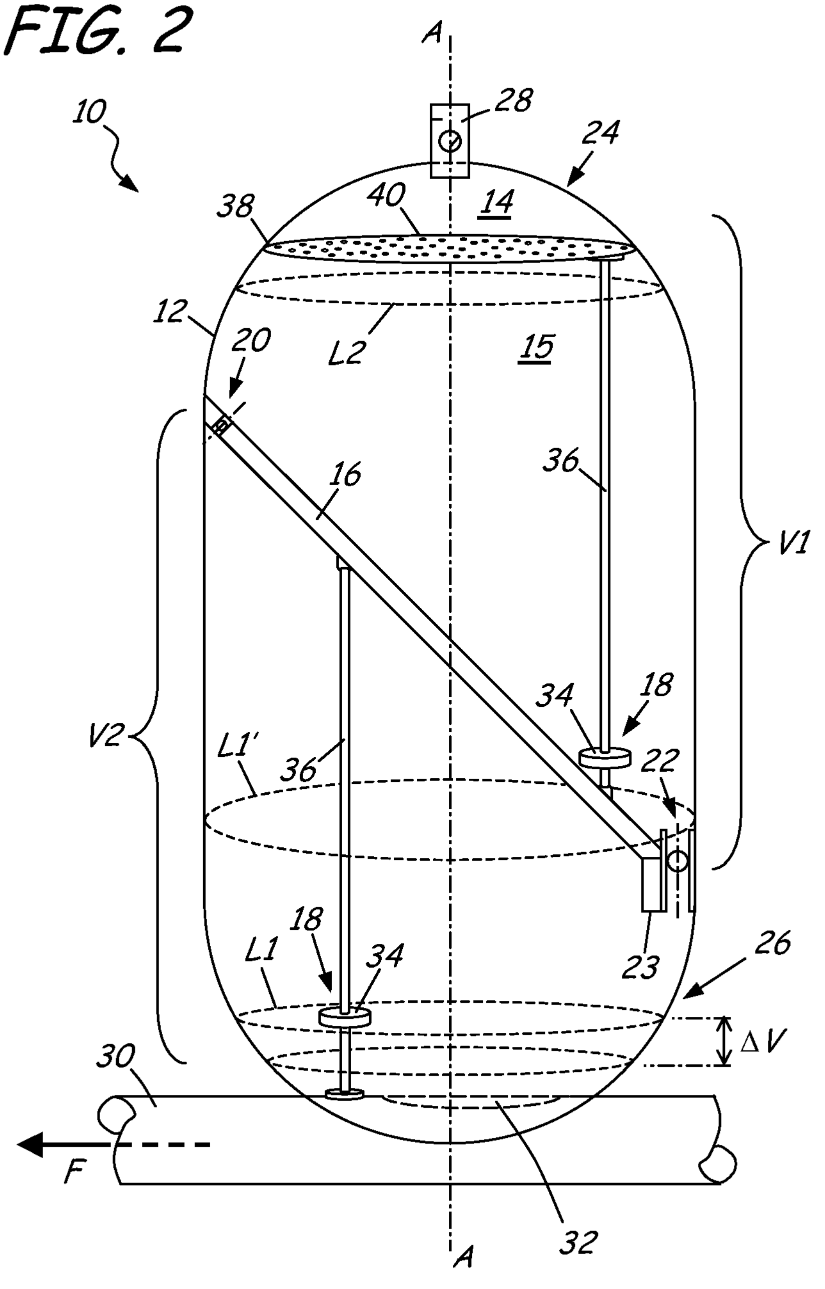
FIG. 2 is a schematic side view of the accumulator, illustrating thermal volumetric change of the working fluid.

FIG. 2 is a schematic side view of accumulator 10, illustrating the thermal volumetric change of working fluid 15. In this particular embodiment, pressure vessel 12 is sized to accommodate a liquid coolant or other working fluid 15 with a substantial coefficient of expansion, where operating volumes range from minimum ("cold") level L1 to maximum ("hot") level L2.

In some embodiments, perforated plate (or perforate) 38 is provided approximately at or above level L2 to prevent mixing with pressurizing fluid 14 in top portion 24 of pressure vessel 12. Perforated plate 38 is provided with weep holes or apertures 40, which are small enough to limit sloshing and upward flow of working fluid (liquid) 15 during turbulence, climb, descent, and negative-g loading conditions. At the same time, weep holes 40 are large enough to allowing pressurizing fluid (gas) 14 to pass substantially freely.

The size of weep holes 40 depends on the viscosity and other properties of working fluid 15, which vary depending on whether a relatively light cooling liquid is used, or a relatively heavy lubricating oil or hydraulic fluid. In one embodiment, weep holes 40 have a nominal diameter of about 4-6 mils (0.004-0.006 inches, or about 0.10-0.15 mm). In other embodiments, weep holes 40 are larger or smaller, for example less than or greater than about 10 mils (0.25 mm), or up to 60-80 mils (1.5-2.0 mm).

As shown in FIG. 2, minimum ("0% full") fluid level L1 is subject to fluctuation based on actual bulk average working fluid temperature, with a corresponding thermal ΔV range. In some applications, ambient temperatures range from about −40° F. (−40° C.) or less to about +100° F. (38° C.) or more. In aviation applications, the full operating temperature range extends from about −70° F. (−57° C.) at altitude to +185° F. (+85° C.) or more, when operating under a full thermal load. At the extremes of these ranges, some working fluids 15 approach a phase change condition characterized by increases in viscosity or "slushiness" at cold temperatures, and increases in vapor pressure and other gaseous phase behavior at high temperatures.

To preserve leak detection capabilities under cold soak and other low-temperature conditions, alternate minimum liquid level L1' lies above flow aperture 22 but below the lower limit of right-hand level sensor 18, with float 34 pegged at the minimum value in upper reservoir volume V1. As shown in FIG. 2, for example, minimum operating level L1' of working fluid 15 is above flow aperture 22, and above the lower attachment point of baffle 16. Conversely, baffle 16 is attached to the inside wall of pressure vessel 12 at a point below minimum operating level L1' of working fluid 15. In some embodiments, the lower attachment point of baffle 16 is located at flow aperture 22, as shown in FIG. 2, and in other embodiments the lower attachment point is located above or below flow aperture 22.

Under full thermal load and other high-temperature conditions, liquid level L2 lies above the upper end of baffle 16, and above purge aperture 20, with left-hand level sensor 18 pegged at a maximum value in lower reservoir volume V2. Under "pegged" conditions for either level sensor 18, the level of working fluid 15 is based on the signal from the "unpegged" level sensor 18, without averaging.

When the liquid level stabilizes at (hot) level L2, flow through aperture 22 is typically minimal. When a leak occurs, however, additional working fluid 15 flows from reservoir volume V2 into flow line 30, replenishing upstream or downstream losses.

For slow leaks, the primary indicator is a change in level L1, L1' or L2 over time, for example hours, days or weeks. For faster leaks, pressure will drop in lower reservoir volume V2 and the resulting pressure differential between volumes V2 and V1 will drive working fluid 15 through flow aperture 22 to replenish lower volume V2. The flow through aperture 22, in turn, generates a corresponding signal in flow sensor 23.

Leak sensitivity varies with application and threat level. In the power electronics cooling system (PECS), for example, coolant flow is mission critical because the PECS motor controllers are used for flight control. Environmental systems such as the forward cargo area cooling (FCAC) and integrated cooling system (ICS) are less directly related to flight control, but leakage is still a substantial concern in these systems, and leak detection remains important to overall system performance.

Across aviation applications, total system volume ranges from less than 6 U.S. gallons (about 19 liters) to 30 gallons (115 liters) or more, with flow rates from 6-35 gallons (23-132 liters) per minute. As a result, the fluid recirculation rate can be on the order of a few minutes or less, and leaks of a fraction of a gallon (3.8 liter) per minute may be significant. Leakage rates must also be compared to the available reserve volume of pressure vessel 12, because system operation can be compromised when working fluid 15 falls below the level of bottom port 32, drawing pressurizing fluid 14 into flow channel 30 and entraining gas into working fluid flow F.

To address these concerns, flow sensor 23 provides a "fast leak" detection sensitivity of approximately 4.00 gal/min (15.14 liter/min) or less. In some embodiments, the sensitivity is 2.00 gal/min (7.57 liter/min) or less, and in other embodiments the sensitivity is 1.0 gal/min (3.79 liter/min) or less, or 0.50 gal/min (1.89 liter/min) or less. Alternatively, the flow sensitivity is defined in terms of the drop in liquid level, for example 0.2 inches per second (5.08 mm per second).

For reservoir capacities on the order of one to three gallons (3.8-11.4 liters), or 10-20% of total system volume, leak sensitivity provides a warning time of around ten minutes or less to an hour or more before system failure. The window is longer for smaller leaks, and shorter for larger leaks.

For PECS and other mission-critical applications, leak detection provides time to shut down non-essential equipment before actual loss of the cooling flow, decreasing thermal loading and preserving the reserve volume of working fluid 15 for critical system elements. For environmental systems and other applications, leak detection allows system protective controls to be implemented, giving the system and flight crew (or other personnel) more time to react, and reducing the likelihood of damage due to loss of the working fluid flow.

Figure 3:
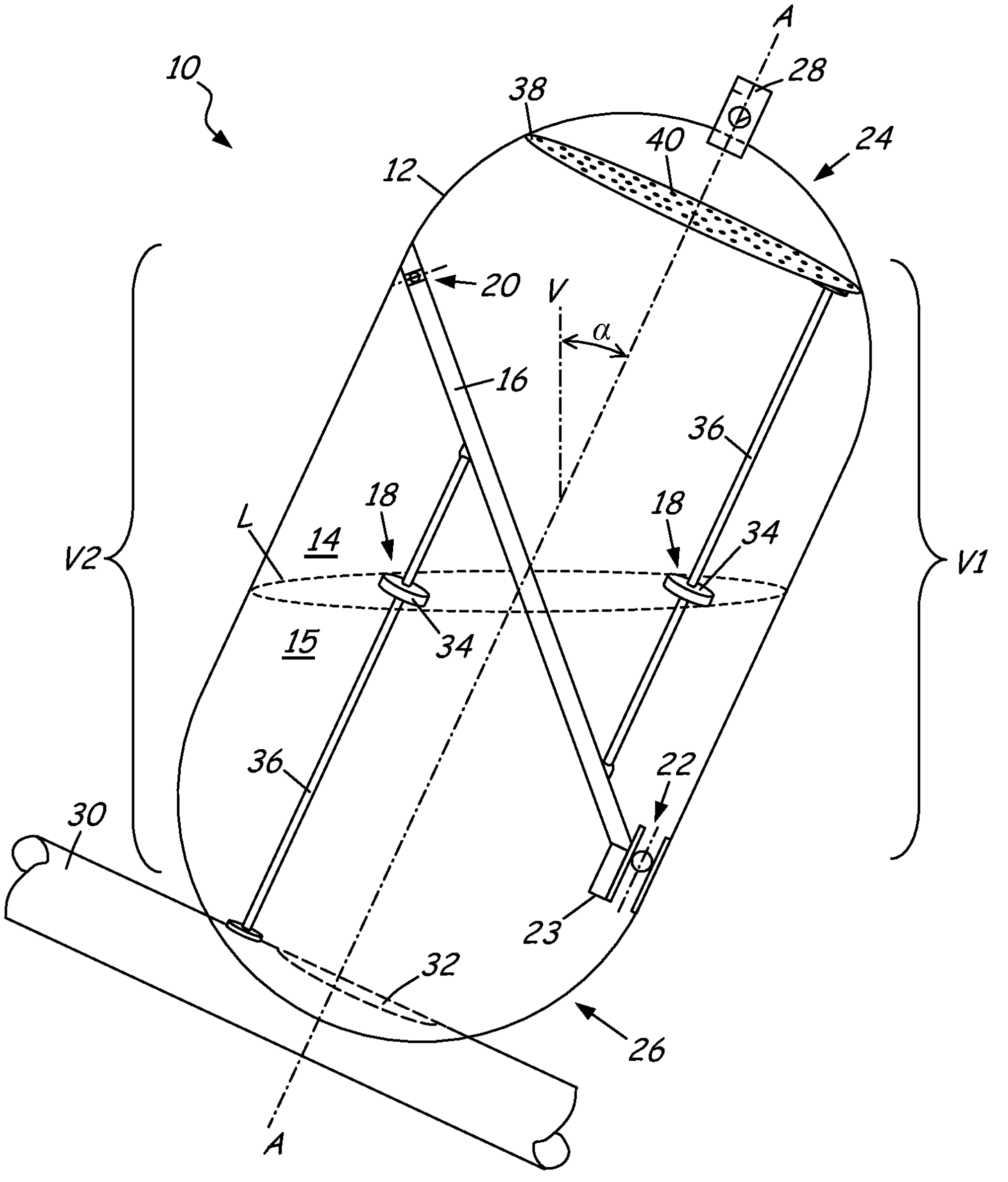
FIG. 3 is a schematic side view of the accumulator, illustrating pitch correction of the working fluid level measurement.

FIG. 3 is a schematic side view of accumulator 10, illustrating pitch correction. In this embodiment, accumulator 10 has a non-vertical orientation, for example as experienced during the takeoff portion of a flight cycle.

As shown in FIG. 3, pitch angle $\alpha$ is defined between axis A of accumulator 10 and "local" vertical V, which is perpendicular to level L of working fluid 15. As thus defined, local vertical direction V accounts for g-effects in turning, which tend to maintain a constant liquid level L along the perpendicular (roll) direction (e.g., in and out of the page).

For pitch correction, level sensors 18 are positioned in opposing locations across accumulator axis A, along the pitch direction (e.g., fore and aft). Floats 34 sample level L of working fluid 15 at different relative positions or heights along stems 36 in reservoir volumes V1 and V2, on either side of baffle 16. This provides a self-corrected volume measurement, based on the average signal from both level sensors 18. In some embodiments, additional pitch, roll, yaw and other attitude correction is provided via feedback from the flight control system.

While this invention has been described with reference to exemplary embodiments, it will be understood by those skilled in the art that various changes may be made and equivalents may be substituted without departing from the scope of the invention. In addition, modifications may be made to adapt particular situations or materials to the teachings of the invention, without departing from the essential scope thereof. The invention is not limited to the particular embodiments disclosed herein, but includes all embodiments falling within the scope of the appended claims.

The invention claimed is:

1. A fluid system comprising:
- a pressure vessel;
- a baffle dividing the pressure vessel into first and second volumes, wherein the baffle is oriented at a skew angle with respect to the pressure vessel;
- a first port for introducing a pressurizing fluid into the first volume;
- a second port for circulating a working fluid within the second volume;
- a purge aperture for purging the pressurizing fluid from the second volume across the baffle into the first volume; and
- a flow aperture for transferring the working fluid through the baffle between the first and second volumes.

2. The system of claim 1, further comprising a flow sensor for measuring a flow rate of the working fluid through the flow aperture.

3. The system of claim 2, further comprising first and second level sensors for sensing a level of the working fluid in each of the first and second volumes.

4. The system of claim 1, wherein the baffle comprises a solid plate sealed to the pressure vessel to prevent flow between the first and second volumes, except at the flow aperture and the purge aperture.

5. The system of claim 4, wherein the skew angle is between about 15 degrees and about 75 degrees with respect to an axis of the pressure vessel.

6. The system of claim 5, wherein the skew angle is between about 30 degrees and about 60 degrees with respect to the axis of the pressure vessel.

7. The system of claim 6, wherein the baffle is attached to the pressure vessel at a lower point located below a minimum operating level of the working fluid.

8. The system of claim 1, wherein the first port is located in a top portion of the pressure vessel to introduce a pressurizing fluid comprising a gas into the first volume.

9. The system of claim 8, wherein the second port is located in a bottom portion of the pressure vessel to circulate a working fluid comprising a liquid within the second volume.

10. The system of claim 9, wherein the purge aperture is sized to allow flow of the gas while substantially limiting flow of the liquid.

11. The system of claim 10, wherein the purge aperture is located above the flow aperture toward the top portion of the pressure vessel, and wherein the flow aperture is located below the purge aperture toward the bottom portion of the pressure vessel.

12. A fluid accumulator comprising:

a pressure vessel having a top portion, a bottom portion and an axis extending therebetween;

a baffle plate oriented at a skew angle to the axis, wherein the baffle plate divides the pressure vessel into a first volume extending above the baffle plate to the top portion and a second volume extending below the baffle plate to the bottom portion;

a gas port in the top portion for charging the pressure vessel;

a liquid port in the bottom portion for circulating fluid through the pressure vessel;

a purge aperture sized for gaseous flow across the baffle plate, from the second volume to the first volume; and a flow aperture sized for liquid flow across the baffle plate, from the first volume to the second volume.

13. The accumulator of claim 12, wherein the skew angle is between about 15 degrees and about 75 degrees.

14. The accumulator of claim 13, wherein the skew angle is between about 30 degrees and about 60 degrees.

15. The accumulator of claim 12, wherein the baffle plate is attached to the pressure vessel at a lower point located below a minimum operating level of the fluid.

16. The accumulator of claim 12, further comprising a flow sensor proximate the flow aperture for sensing a rate of the liquid flow across the baffle plate.

17. The accumulator of claim 16, further comprising a first level sensor in the first volume of the pressure vessel and a second level sensor in the second volume of the pressure vessel.

18. The accumulator of claim 12, further comprising a perforate element in the top portion of the pressure vessel, the perforate element comprising apertures sized to allow gaseous flow across the perforate element while limiting liquid flow across the perforate element.

19. An accumulator for a fluid system, the accumulator comprising:

a pressure vessel having an axis;

a baffle plate dividing the pressure vessel into first and second volumes, wherein the baffle plate is oriented at a skew angle with respect to the axis;

a top port for introducing a pressurizing gas into the first volume;

a bottom port for exchanging a working fluid with a process flow in the second volume;

a purge aperture in the baffle plate, wherein the purge aperture is sized to purge the pressurizing gas from the working fluid in the second volume;

a flow aperture in the baffle plate, wherein the flow aperture is sized to transfer the working fluid between the first and second volumes; and a flow sensor proximate the flow aperture for measuring a flow rate of the working fluid across the baffle plate.

20. The accumulator of claim 19, wherein the skew angle is between about 15 degrees and about 75 degrees.

21. The accumulator of claim 20, wherein the skew angle is between about 30 degrees and about 60 degrees.

22. The accumulator of claim 19, wherein the baffle plate is attached to the pressure vessel at a lower point located below a minimum operating level of the working fluid.

23. The accumulator of claim 22, wherein the purge aperture is located above the flow aperture toward the top port, and wherein the flow aperture is located below the purge aperture toward the bottom port.

24. The accumulator of claim 19, further comprising a first level sensor in the first volume of the pressure vessel and a second level sensor in the second volume of the pressure vessel.

25. The accumulator of claim 24, wherein the first and second level sensors are located in opposing positions across the axis to correct for a pitch angle of the pressure vessel.

* * * * *